United States Patent [19]

Howard

[11] 4,284,421

[45] Aug. 18, 1981

[54] AIR-CLEANING APPARATUS

[76] Inventor: Arthur G. Howard, 7711 Newport Way, Apt. D, Indianapolis, Ind. 46250

[21] Appl. No.: 121,961

[22] Filed: Feb. 15, 1980

Related U.S. Application Data

[63] Continuation-in-part of Ser. No. 923,713, Jul. 12, 1978.

[51] Int. Cl.³ ............................................. B01D 47/02
[52] U.S. Cl. ........................................ 55/222; 55/242; 55/257 PV; 55/269; 55/DIG. 36; 55/442; 126/299 E; 261/92; 165/101; 165/103
[58] Field of Search ................. 55/222, 240, 242, 241, 55/269, 400, 257 PV, 442, DIG. 36; 261/92, 90; 126/299 E; 165/87

[56] References Cited

U.S. PATENT DOCUMENTS

| | | |
|---|---|---|
| 1,617,815 | 2/1927 | Lissauer et al. |
| 1,947,863 | 2/1934 | Mahoney . |
| 3,494,108 | 2/1970 | Moragne . |
| 3,522,000 | 7/1970 | Kinney . |
| 3,672,128 | 6/1972 | Heffron . |
| 3,762,394 | 10/1973 | Newcommer . |
| 3,827,343 | 8/1974 | Darm . |
| 3,837,269 | 9/1974 | Sweet et al. . |
| 3,921,709 | 11/1975 | Ferres . |
| 3,983,796 | 10/1976 | Ahlrich . |
| 4,084,745 | 4/1978 | Jones . |

FOREIGN PATENT DOCUMENTS

204394 11/1956 Australia .

*Primary Examiner*—Bernard Nozick
*Attorney, Agent, or Firm*—Woodard, Weikart, Emhardt & Naughton

[57] ABSTRACT

An air-cleaning, heat-exchange apparatus includes a main housing portion connected by means of an air inlet fan to the kitchen exhaust stack of a restaurant. The apparatus includes a plurality of heat exchangers through which a heat-absorptive fluid is circulated, simultaneously, by means of a suitable fluid pump. These heat exchangers absorb heat from the hot exhaust gas, out of the exhaust stack of the restaurant, which flows over and through these heat exchangers and transfers this heat to the circulating fluid which communicates with remote heat exchangers. These remote heat exchangers further transfer this heat to a stream of air, such as that from a cold-air return duct for supplementing the conventional heating system of the restaurant. Due to the fact that such hot exhaust gas is heavily grease laden, grease will be deposited on virtually all internal surfaces of the apparatus which this exhaust gas contacts. Consequently, means are provided for spraying these contacted internal surfaces, as well as the hot exhaust gas itself, with a detergent solution in which the grease is soluble, thereby removing grease buildup from these internal surfaces.

16 Claims, 11 Drawing Figures

AIR-CLEANING APPARATUS

REFERENCE TO RELATED APPLICATION

This application is a continuation-in-part patent application of my co-pending U.S. patent application, Ser. No. 923,713, filed July 12, 1978.

BACKGROUND OF THE INVENTION

The present invention relates in general to air-cleaning apparata and in particular to such apparata which also achieve heat exchange and heat transfer.

Industrial exhaust poses a major problem from the standpoint of pollution, and with the promulgation of federal rules and regulations and clean air standards, many efforts have been focused on how to reduce the level of contaminants from the effluent wastes. A related problem occurs in the area of restaurant exhaust from areas such as grills and broilers. Restaurants, expecially fast-food restaurants, generate large amounts of grease-laden exhaust from the frying and broiling of the various food items which are prepared. This grease-laden exhaust is typically drawn up through a kitchen hood and exhaust duct combination to the atmosphere by a large ventilating fan arrangement. The problem with this type of design is that the grease from the exhaust collects on the internal surfaces of the hood, the exhaust duct and the fan arrangement and must be periodically cleaned. The frequency of required cleaning depends upon the volume of exhaust and the amount of grease, but a cleaning frequency of once a month is very often advisable in order to assure that grease levels will not reach the point where a fire occurring in the kitchen area will spread to and ignite this grease. Unfortunately, the thorough cleaning of the grease from the hood, exhaust duct and ventilating fan arrangement is difficult and is often quite time consuming and represents significant downtime to the particular restaurant. As a result of the inconvenience represented by the cleaning procedure, removal of the grease from the internal surfaces is not always performed when required. A somewhat predictable consequence of this lack of proper and periodic cleaning is that the hood, exhaust duct and fan arrangement will become heavily grease coated as well as producing a noticeable odor. Significant fire disasters have occurred where a grease fire in the kitchen exhaust duct was attributed to be a cause or at least a contributing factor to the spreading of the fire.

Recently efforts have been made to chemically treat such grease-laden exhaust so that the grease is emulsified and its buildup on internal surfaces is reduced. By using a mist-like spray of a chemical and water mixture directed around the inside of the exhaust duct between the hood and ventilating fan, the emulsified grease is either drained off in liquid form or may be exhausted in vapor form. Although this method has proved effective to prevent a majority of the grease buildup in the exhaust duct and on the ventilating fan, there remain certain shortcomings and disadvantages.

The spray arrangement just mentioned must have its volume of chemical solution governed by the volume of exhaust and the amount of grease, and to be effective, the sprayer must direct a mist against the full inside perimeter of the exhaust duct so that all surfaces can be cleaned of grease. This poses a very exacting requirement on the design of the spray nozzle head as well as its positioning within the exhaust duct. However, even with well-designed and positioned spray nozzle heads, the grease which is emulsified by the chemical solution spray does not represent 100 percent of the grease flowing through the exhaust duct and the emulsified grease which is exhausted in vapor form, as well as the grease which is not chemically treated, still contributes to the pollution of the atmosphere. Another very significant factor, especially with energy consideration concerns, is the amount of heat which is generated by the restaurant grills and broilers and is lost up the exhaust duct. Any attempt to capture this heat and reuse it for general heating of the structure runs headlong into the related problems of grease accumulation. If a heat exchanger is employed, once the convecting surfaces, such as the fins, collect a thin film of grease, the heat-transfer properties of such convecting surfaces are reduced to the point that the heat exchanger becomes highly inefficient. This grease buildup acts as a thermal insulator and prevents efficient heat transfer from the hot exhaust gas to a heat-absorptive fluid circulating through the heat exchanger. Related problems involve how to extract a majority of this exhaust duct heat so that system efficiency is high and how can the complete system be maintained in a virtually grease-free manner while still not exhausting harmful pollutants (such as emulsified grease) into the atmosphere. A collateral benefit of grease removal is that the accompanying odor will also be eliminated. The shortcomings and disadvantages discussed above are overcome by the apparatus of the present invention which is disclosed herein.

SUMMARY OF THE INVENTION

An exhaust-cleaning, heat-exchange apparatus for removing contaminant material from a hot exhaust gas from a structure exhaust stack and for extracting heat from the hot exhaust gas according to one embodiment of the present invention comprises a main housing portion communicating with the structure exhaust stack, contaminant-collecting surface means disposed within the main housing portion, sprayer means arranged within the main housing portion and directed toward the contaminant-collecting surface means for spraying a chemical solution onto the contaminant-collecting surface means, heat-exchange means disposed within the main housing portion, fluid circulating means for circulating a heat-absorptive fluid through said heat-exchange means, and a first fan arrangement in communication with the main housing portion and the exhaust stack for routing hot exhaust gas across the heat-exchange means whereby heat is transferred from the hot exhaust gas to the circulating heat-absorptive fluid.

One object of the present invention is to provide an improved exhaust-cleaning, heat-exchange apparatus.

Related objects and advantages of the present invention will be apparent from the following description.

DESCRIPTION OF THE PREFERRED EMBODIMENT

Figure 1:
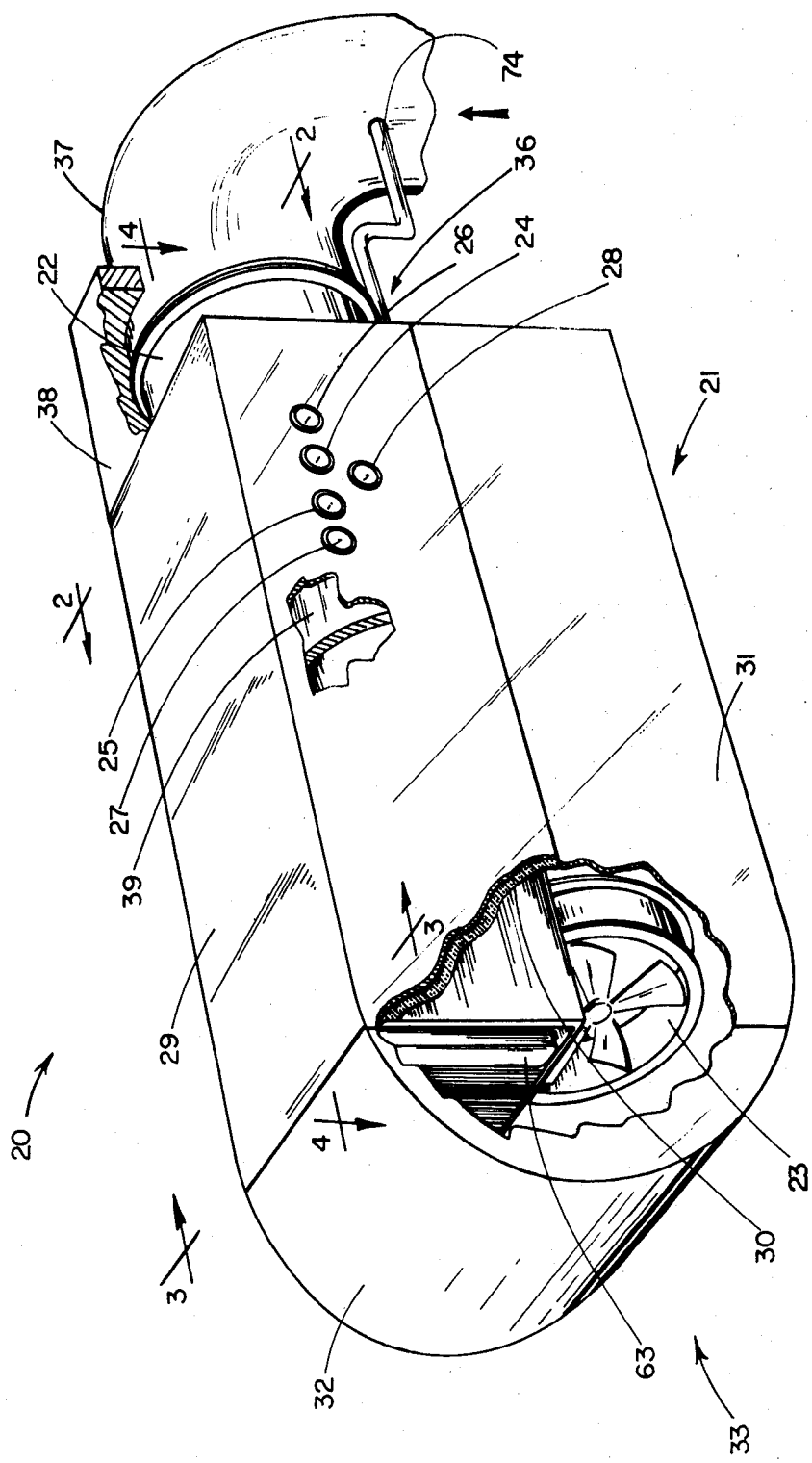
FIG. 1 is a fragmentary, perspective view of an exhaust-cleaning, heat-exchange apparatus according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being comtemplated as would normally occur to one skilled in the art to which the invention relates.

Referring to FIG. 1, there is illustrated exhaust-cleaning, heat-exchange apparatus 20 which includes a main housing portion 21, a first fan arrangement 22, a second fan arrangement 23 and a plurality of dial indicators 24, 25, 26, 27 and 28 whose functions will be described hereinafter. Main housing portion 21 includes a top skin 29 which is insulated by a thickness of insulation 30 disposed on the inner surface, a lower skin 31 fabricated of expanded material which is sealingly joined to the lower perimeter edge of top skin 29 and a connecting duct portion 32 which encloses the free end 33 of apparatus 20 between top skin 29 and lower skin 31. An intermediate duct section (not shown in FIG. 1) connects second fan arrangement 23 with connecting duct portion 32 for structural rigidity and an efficient flow pattern.

The first fan arrangement is sealingly joined at one flanged end of arrangement 22 around a circular opening in top skin 29 at first end 36 of apparatus 20. The opposite flanged end of first fan arrangement 22 is sealingly joined around the perimeter of exhaust stack 37. Although exhaust stack 37 may represent virtually any suitable duct of a structure through which contaminant material is exhausted, typically in gaseous form, in the preferred embodiment exhaust stack 37 is the exhaust duct extending from a restaurant kitchen area and the hot exhaust gas which flows up through exhaust stack 37 is typically heavily grease laden. Apparatus 20 includes a central flow passageway which extends from first end 36 to opposite free end 33 and is enclosed by top skin 29 in combination with lower skin 31. Inasmuch as the circular opening in first end 36 represents the sole point of entry into apparatus 20 for the hot exhaust gas from exhaust stack 37, apparatus 20 which draws this hot exhaust gas into its interior by means of the two fan arrangements, functions as a closed system. As this hot exhaust gas flows through apparatus 20, heat is extracted by a series of heat exchangers while any grease which is deposited on the internal surfaces of apparatus 20 is removed by a chemical solution spray directed at these internal surfaces. Consequently, the flow of exhaust gas which is present at end 33 is lower in temperature than the entering exhaust gas at end 36 and the grease which was contained within the entering exhaust gas is removed by the time the exhaust gas reaches free end 33. The exhaust gas present at end 33 is pulled into the lower portion of apparatus 20 by means of the second fan arrangement 23. As this still-warm exhaust gas passes into this lower region, which is surrounded by lower skin 31, a certain degree of heat will be transferred to the internal and surrounding portions of apparatus 20 thereby providing a blanket of warm air and reducing the effect of a severely cold temperature exterior to apparatus 20. This feature is important inasmuch as apparatus 20 is typically located on the roof of a structure and is exposed to all types of environmental conditions, including extremely cold temperatures. Due to the fact that one feature of apparatus 20 is the extraction of heat from the entering hot exhaust gas, it is important that heat losses to the atmosphere be reduced to as great a degree as possible. This warm, clean exhaust gas from free end 33 assists in this heat loss reduction by acting as a buffer between the heat exchangers and the atmosphere.

Figure 2:
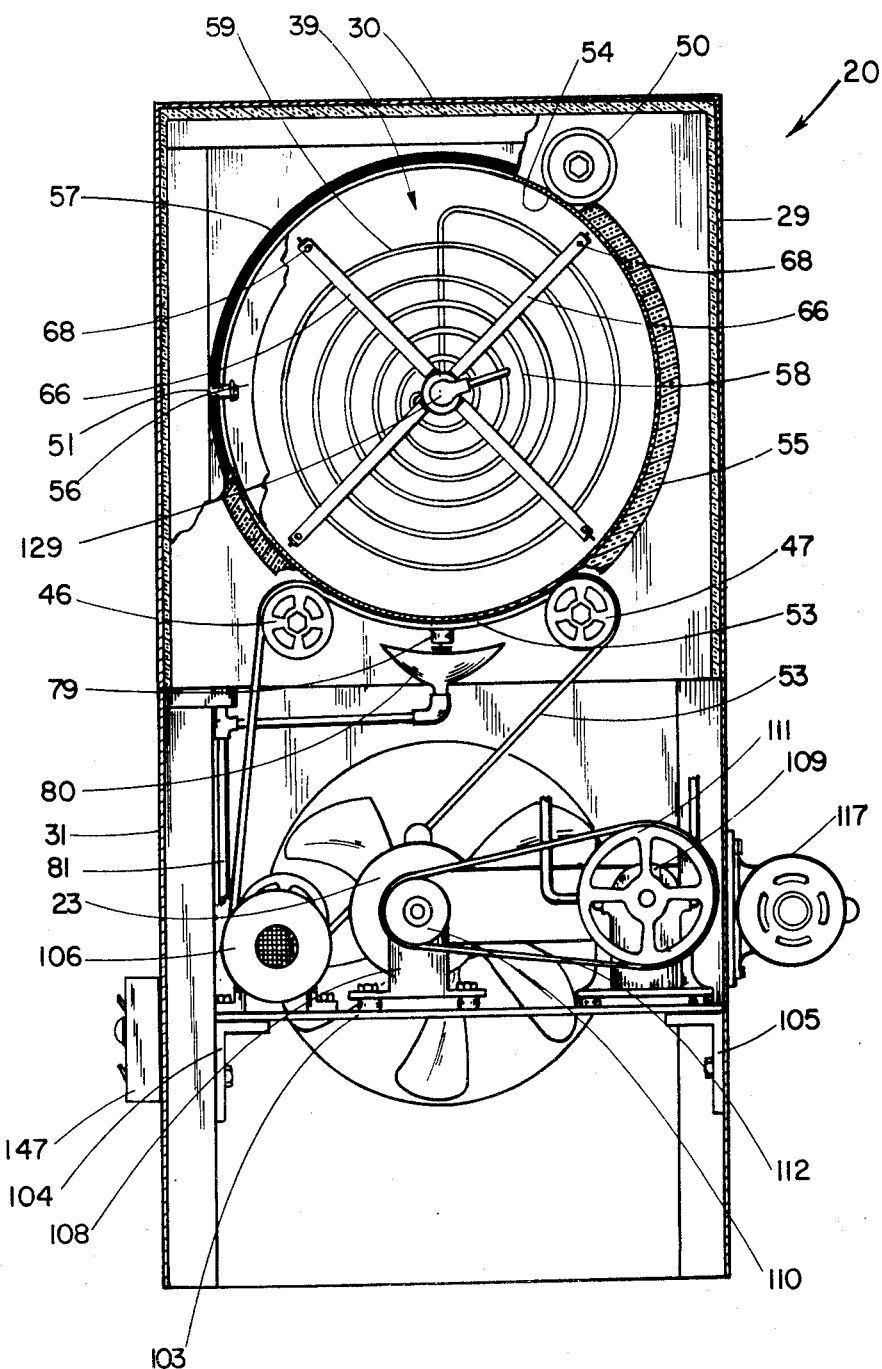
FIG. 2 is a sectioned, end elevation view of the FIG. 1 apparatus as taken along line 2—2 in FIG. 1.
Figure 3:
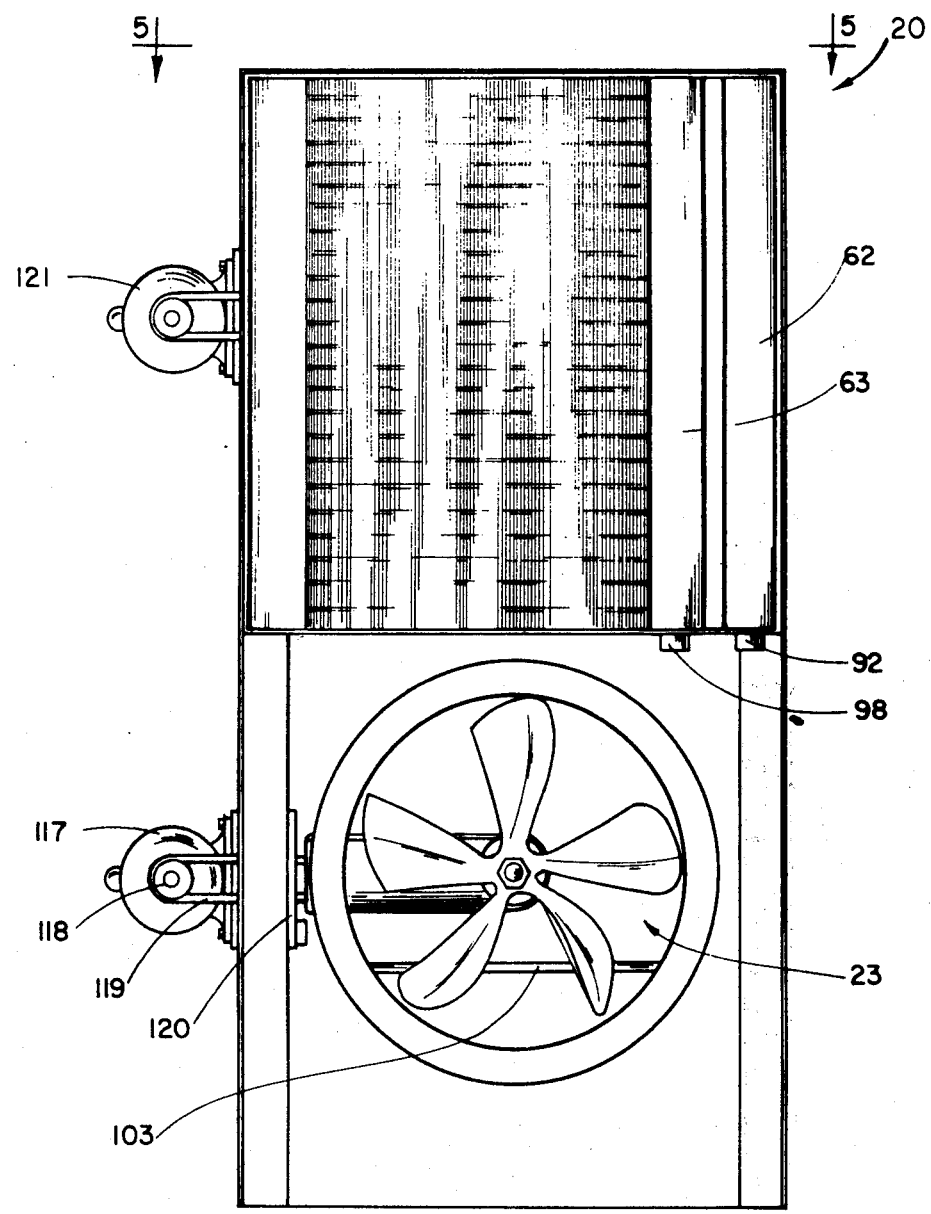
FIG. 3 is a sectioned, end elevation view of the FIG. 1 apparatus as taken along line 3—3 in FIG. 1.

In the operation of a restaurant kitchen, what typically occurs is that grease-laden exhaust from broilers and grills is drawn up through a suitable exhaust hood and duct arrangement by means of a suitable ventilating fan. As the particles of grease which are within this exhaust come in contact with the various internal surfaces of the exhaust duct and the ventilating fan, grease is deposited on these surfaces. After only a brief period of operation, the grease level becomes critical with respect to efficiency of the ventilating fan as well as representing a potential fire hazard. The present invention provides an apparatus which is connectable to such an exhaust duct and provides means by which grease on internal surfaces may be virtually eliminated while at the same time extracting heat from this hot exhaust gas which can be utilized to supplement some of the heating requirements for the structure with which apparatus 20 is associated. When apparatus 20 is employed, as will be described hereinafter, a ventilating fan located within the exhaust stack is not required inasmuch as first fan arrangement 22 provides the necessary pulling draft for removal of the exhaust from the kitchen area. First fan arrangement 22 sealingly joins to exhaust stack 37 in a suitable manner which does not permit exhaust leakage. Surrounding first fan arrangement 22 is a small cover portion 38 which connects to and completely around the flange of the first fan arrangement 22 and also to top skin 29 so as to enclose first fan arrangement 22. The opposite flanged end of fan arrangement 22 sealingly joins to the circular opening in top skin 29 as has been previously discussed. Located within top skin 29 is a cylindrical drum member 39 (see FIGS. 2 and 4) which extends for approximately one-half the overall length of apparatus 20 beginning at first end 36. The first end 40 of drum member 39 is located adjacent first fan arrangement 22 and drum member 39 is structurally arranged so as to be rotatable with respect to first fan arrangement as will be described in greater detail hereinafter. By sealingly arranging flanged end 41 in alignment with first end 40 of drum member 39, virtually all the hot exhaust gas which is drawn up through exhaust stack 37 will be pushed by first fan arrangement 22 into and through drum member 39. However, due to the fact that the drum member rotates with respect to the fan arrangement a slight clearance is provided. Since this clearance permits some leakage of the entering hot exhaust gas to occur, cover 38 creates an enclosure which limits such leakage and prevents leakage to the atmosphere.

Figure 4:
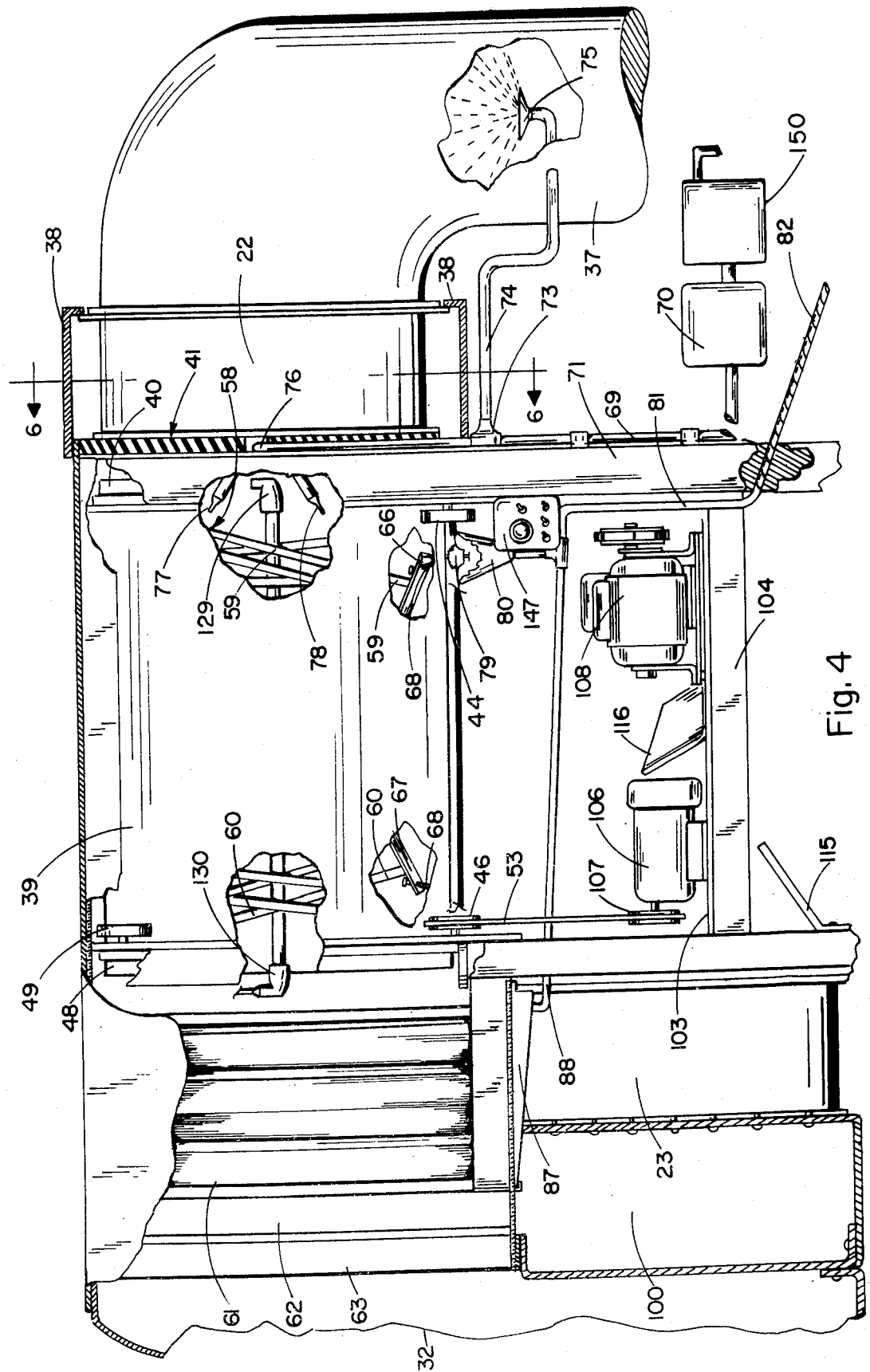
FIG. 4 is a sectioned, side elevation view of the FIG. 1 apparatus as taken along line 4—4 in FIG. 1.

Apparatus 20 further includes a structural frame fabricated from aluminum angles and square aluminum tubing which is arranged so as to provide four leg-like support members and a box-like structure thereabove. Although drum member 39 is positioned within the confines of this box-like frame structure, member 39 is thermally insulated therefrom and mechanically separated therefrom such that the entire support for drum member 39 with respect to the structural frame is by means of an arrangement of drive rollers and idle rollers. Drum member 39 rests upon a pair of idle rollers 44 and 45 which are disposed beneath drum member 39, rotatably fixed to the box-like frame structure, and adjacent end 40. Although only idle roller 44 is illustrated in FIG. 4, it is to be understood that idle roller 45 is in line with idle roller 44 but on the opposite side of drum member 39. Drive rollers 46 and 47 are disposed at the opposite second end 48 of drum member 39 and are rotatably fixed to their corresponding adjacent portion of the box-like frame structure. Rollers 46 and 47 act in combination with a belt drive and gear motor to provide rotation to drum member 39. Also adjacent second end 48 of drum member 39 are two additional idle rollers 49 and 50 which provide a retaining and steadying feature to the rotation of drum member 39 to rigidly hold drum member 39 in contact with drive rollers 46 and 47 as well as drive belt 53, a portion of which extends between drive rollers 46 and 47 and contacts the underside portion of drum member 39. Drum member 39 includes a cylindrical metal body portion 54, an outer layer of insulation 55, an inner end lip portion 56 which extends completely around first end 40 of drum member 39 for retaining fluid which may collect within cylindrical body member 54 and an exterior air seal 57 which rotates with drum member 39 and provides additional sealing properties to prevent excess hot exhaust gas leakage. A guide roller 51 is provided at first end 40 for assisting in controlling any longitudinal shift of drum member 39.

Disposed within cylindrical body member 54 of drum member 39 is a first heat exchanger 58 which includes a first tapered, spiralled arrangement 59 of copper tubing having its larger diameter end adjacent end 40 and which extends from a location adjacent end 40 to a second location adjacent end 48. Heat exchanger 58 further includes a second tapered, spiralled arrangement 60 also of copper tubing which criss-crosses with the first spiralled arrangement 59 in that the smaller diameter end of arrangement 60 is adjacent end 40. The flow passageway through first arrangement 59 and the flow passageway through second arrangement 60 are tied together at common points such that as a heat-absorptive fluid is circulated through this copper tubing, heat transfer to the heat-absorptive fluid can be effected simultaneously from both arrangements. Consequently, as hot exhaust gas is pushed through apparatus 20 by means of first fan arrangement 22, a portion of the heat within this hot exhaust gas will be transferred to the copper tubing which in turn will conduct its absorbed heat to the circulating heat-absorptive fluid passing therethrough. From this point, the hot exhaust gas, which is now at a somewhat lower temperature, passes further downstream through apparatus 20 where it flows across a mist eliminator 61 and passes therethrough and then across a second heat exchanger 62 and after that through and across a third heat exchanger 63. The structure and functions of the mist eliminator 61 and the second and third heat exchangers 62 and 63 will be described in greater detail hereinafter. At this point, it should be understood that mist eliminator 61 and heat exchangers 62 and 63 are located substantially central to the flow stream of the hot exhaust gas.

Although the heat-exchange aspects of apparatus 20 may be viewed as of a conventional nature and known to the art, it is to be pointed out that the particular arrangement of drum member 39 which is thermally insulated as a unit as well as from the surrounding portions of apparatus 20 provides a highly efficient heat transfer mechanism wherein heat losses to surrounding structural members or to the atmosphere are significantly reduced. The only contact which drum member 39 makes with the surrounding box-like frame structure is indirectly through the various idle rollers and drive rollers. Since these rollers are coated with a rubber or synthetic compound, any heat transfer is negligible. A further feature which contributes to the overall efficiency to the heat transfer between the hot exhaust gas and the heat-absorptive fluid in first arrangement 59 and second arrangement 60 is that the copper tubing of these arrangements is supported within drum member 39 by a minimal area of metal-to-metal contact. This is achieved by the use of bracket bars 66 and 67 which are rigidly joined to their corresponding arrangements of copper tubing and are force-retained within cylindrical body member 54 by means of bolts 68 which are threadedly received by the free ends of the various bracket bars at the larger diameter end of their respective arrangements and are threadedly advanced into pressure contact with the internal surfaces of cylindrical body member 54. There are four bracket bars 66, 90 degrees apart, associated with first arrangement 59 and there are similarly four bracket bars 67 associated with second arrangement 60. There are various options available to securely position the two arrangements within body member 54, such as, for example, clamping together the crossing points of corresponding pairs of bracket bars 66 and 67.

As a result of this minimal metal-to-metal contact arrangement, any heat loss or heat transfer from the copper tubing to the metal surface of cylindrical body member 54 must be through the bolts 68 and this minimal surface area of contact means that a minimal amount of heat transfer will occur. As previously mentioned, the hot exhaust gas which arrives through exhaust stack 37 is typically heavily grease laden. As this grease-laden exhaust gas flows up through exhaust stack 37, through first fan arrangement 22 and then into drum member 39, portions of this grease will be deposited on all internal surfaces of apparatus 20 which the grease-laden exhaust gas comes in contact with. In order to continuously maintain apparatus 20 as a wet system, a feature which greatly contributes to fire prevention, and to prevent any grease buildup from occurring on such internal surfaces, a chemical solution sprayer arrangement is provided which communicates with a suitable source of chemical solution for delivery into apparatus 20. Tubing line 69 couples to a source 70 of chemical solution and extends upwardly along support leg 71 to which it may be attached by means of suitable clips or brackets. At the approximate base of first fan arrangement 22, tubing line 69 splits into two different branches by means of a suitable tee fitting 73. Branch line 74 extends from tee fitting 73 over and into exhaust stack 37. The insertion of branch line 74 into exhaust stack 37 is by means of a sealed connection and the free end of branch line 74 is provided with a 160° spray nozzle head which is centrally positioned within exhaust stack 37 and is directed outwardly toward the internal surfaces of exhaust stack 37 and upwardly toward first fan arrangement 22. As chemical solution is delivered through branch line 74 to nozzle head 75, a spray mist is sprayed upon the internal surfaces of exhaust stack 37. Inasmuch as a chemical solution is selected in which the particular exhaust gas contaminant, such as, in this case grease, is soluble; contact of the spray mist with grease which has collected on these internal surfaces causes the grease to go into liquid solution in emulsified form. Although such liquid solution may initially drain down exhaust stack 37 back toward the kitchen area of the restaurant, the continuing upward flow of hot exhaust gas converts this emulsified grease-containing liquid into vapor form and conducts it on through apparatus 20. Due to the fact that the grease has been broken down and placed in a solution wherein it is soluble, this grease remains in liquid solution and is not deposited on subsequently contacted internal surfaces. However, the spray mist from nozzle head 75 is not typically effective to place all of the grease flowing through exhaust stack 37 into an emulsified condition due to the volume of exhaust and amount of grease. Consequently, some grease will be deposited on the internal surfaces of drum member 39 including the first arrangement 59 of copper tubing as well as the second arrangement 60 of copper tubing. However, the presence of spray nozzle head 75 at its location with exhaust stack 37 does provide sufficient cleansing action of the interior surfaces of exhaust stack 37 as well as a majority of the first fan arrangement 22. This means that the exhaust stack 37 exiting from the kitchen portion of the restaurant remains in virtually a grease-free status and thereby precludes the presence of a fire hazard due to grease collection.

In order to deal with grease buildup which occurs on the internal surfaces of drum member 39 and the external surfaces of the first and second arrangements of copper tubing, branch line 76 extends upwardly and then inwardly to the approximate center of the hot exhaust gas flow stream which coincides with the approximate geometric center of drum member 39 and first fan arrangement 22. At this point, branch line 76 splits by means of a suitable fluid connection into spray nozzle heads 77 and 78 which are directed inwardly toward drum member 39 and outwardly toward the internal surfaces of cylindrical body member 54. These two spray nozzle heads are disposed on opposite sides of the cylindrical axis of drum member 39 in a generally symmetrical manner. The angular spray direction of each nozzle head as well as the angular separation between spray nozzle head 77 and spray nozzle head 78 may be varied, depending upon the particular size of drum member 39, the volume of exhaust gas, the amount of grease, and the rate at which drum member 39 is rotated. It is important to note that spray nozzle heads 77 and 78 are stationary with respect to main housing portion 21 and create a fixed spray pattern with respect to the interior of drum member 39. As the chemical solution spray originating from source 70 is generated through nozzle heads 77 and 78, it contacts portions of the external surfaces of first arrangement 59 and second arrangement 60 as well as portions of the internal surface of cylindrical body member 54. This chemical solution spray places the grease which it contacts into an emulsified state. Some of this emulsified grease is collected in the lower portion of body member 54 in a liquid carrier resulting from the excess spray liquid, and some is placed into vapor form by the action of the hot exhaust gas which continues to flow through apparatus 20. This flowing hot exhaust gas is also effective to carry portions of the chemical solution spray to other regions of the drum member downstream from the location of spray nozzle heads 77 and 78. In this manner, virtually all areas of drum member 39 and arrangements 59 and 60 will receive a portion of the chemical solution spray mist. Inasmuch as spray nozzle heads 77 and 78 are stationary, it is not guaranteed that all areas of drum member 39 will be contacted due to inherent design inefficiencies in nozzle designs and positioning. For this reason, drum member 39 rotates at approximately one revolution per minute so that all regions can be guaranteed contact with the chemical solution spray mist. The grease removal from the external surfaces of first arrangement 59 and second arrangement 60 insure that high heat transfer efficiency will be maintained and that an insulating layer of grease will not be permitted to build up on these surfaces which would significantly reduce heat transfer.

Grease from within drum member 39 which is placed into a liquid mixture with the chemical solution accumulates in the lowest level of drum member 39 and a drain outlet 79 is provided by which this liquid mixture may be removed from within drum member 39. Drain outlet 79 opens into a funnel member 80 which connects to drain tube 81 which ultimately flows to the drain system of the structure. It is possible for this grease and chemical solution mixture to congeal in the event the surrounding temperature is sufficiently low. However, inasmuch as warm air is introduced beneath drum member 39 by means of second fan arrangement 23, the portion of drain tube 81 which is interior to apparatus 20 remains warm enough so that the grease mixture will not congeal. The portion of drain tube 81 which exits from apparatus 20 is wrapped with electrical tape 82 thereby providing sufficient heat to retain the grease and chemical solution mixture in liquid form.

Figure 5:
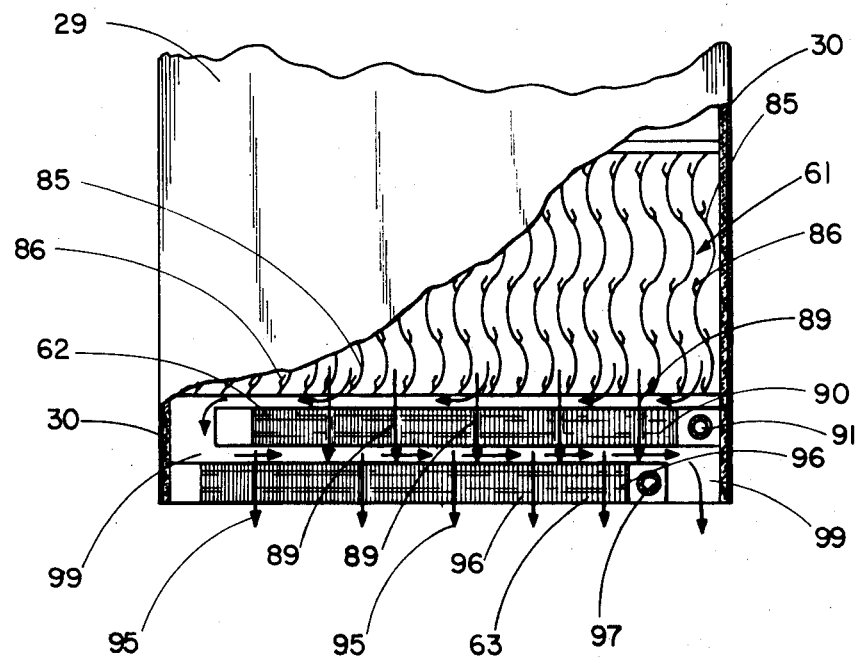
FIG. 5 is a fragmentary, partial plan view of one end of the FIG. 1 apparatus.

The emulsified grease which remains in vapor form as part of the hot exhaust gas is circulated through drum member 39 and out end 48. Adjacent to end 48 of drum member 39 is a mist eliminator 61 (see FIGS. 4 and 5) which includes a plurality of evenly spaced tortuous passageways through which the exhaust gas must flow. These various passageways are separated by corrugated panels which have a plurality of rib-like hooks which alternately protrude from one side of each panel and then the other side. A suitable mist eliminator for this particular application is a model 921-22 offered by the Heil Process Equipment Company of Cleveland, Ohio. Panels 85 are thin-walled members measuring approximately 0.040 to 0.050 inches in thickness and the hooks 86 are spaced along the panels approximately every four inches. Such a mist eliminator is effective to remove approximately 99 percent of the liquid content of the gaseous flow which passes across and through the mist eliminator 61. This is the final stage which removes virtually all remaining grease from the exhaust gas circulating through apparatus 20. By taking the emulsified grease out of vapor form and converting it back into a liquid mixture, this being performed by mist eliminator 61, this remaining grease is able to be drained out of apparatus 20 by means of inclined drain pan 87 and drain tube 88 which couples to drain tube 81 by means of a suitable fluid connection. Now that virtually the entire grease content of the hot exhaust gas has been removed as well as a portion of the heat having already been extracted by means of first heat exchanger 58, subsequent heat removal can occur. This is accomplished by second heat exchanger 62 and then by third heat exchanger 63. Arrows 89 represent the flow path of the hot exhaust gas which exits from mist eliminator 61. This flow path is through second heat exchanger 62 which is constructed in much the same manner as an automobile radiator. Second heat exchanger 62 includes a plurality of closely-spaced fin members 90 through which this hot exhaust gas is permitted to flow. Running in a direction normal to this gas flow direction is a length of tubing which winds back and forth through second heat exchanger from one end to the other. A heat-absorptive fluid is provided to this length of tubing by means of fluid inlet 91. This heat-absorptive fluid is permitted to circulate through second heat exchanger 62 in that a return fluid outlet 92 is also provided at the opposite end of the length of tubing from fluid inlet 91. The exhaust gas flow which passes through and exits from second heat exchanger 62 thereafter enters heat exchanger 63 and has an exhaust gas flow therethrough as indicated by arrows 95. Third heat exchanger 63 is also arranged with a plurality of fin members 96 and a length of tubing extending through heat exchanger 63 in a direction normal to arrows 95 and is connected between fluid inlet 97 and fluid outlet 98. Inasmuch as the exhaust gas flow through second heat exchanger 62 has a maximum volumetric capacity, an alternate or escape route is also provided for exhaust gas flow which exceeds the maximum of heat exchanger 62. This alternative exhaust gas escape path 99 extends along the face of second heat exchanger 62 and around one end. From this point, this escape path extends between second heat exchanger 62 and third heat exchanger 63 to the opposite end of heat exchanger 63. At this point, the exhaust gas flowing through the escape path joins with that exhaust gas which has passed through third heat exchanger 63 and this combined flow is drawn down through connecting duct 32 into second fan arrangement 23. An intermediate duct section 100 is provided as an interface between connecting duct 32 and second fan arrangement 23. This intermediate duct section 100 is provided for structural and fabrication convenience in that it is rigidly secured to one flanged end of second fan arrangement 23 and joins with connecting duct 32 at its opposite side.

By the time the exhaust gas reaches second fan arrangement 23, all the heat which can be extracted has been extracted. Furthermore, the grease buildup within apparatus 20, as well as within exhaust stack 37, has been converted into a liquid mixture and has been drained off to the drain system of the structure. The gaseous flow reaching second fan arrangement is still relatively warm and is now quite clean. This gaseous flow is directed across the lower portion of apparatus 20 for the providing of a heating blanket of air which has been previously mentioned.

This lower portion of apparatus 20 includes a structural shelf 103 which is supported on opposite sides by shelf brackets 104 and 105 which are bolted to adjacent frame leg members. Supported on structural shelf 103 are the various drive components for the drum member rotation and the circulation of the heat-absorptive fluid through the three heat exchangers. Drive motor 106 is an electric gear motor which is mechanically coupled by means of pulley 107 and drive belt 53 to drive rollers 46 and 47 which create a friction drive with drum member 39 as previously described. A suitable motor for drive motor 106 is a model 3M126A offered by Dayton Electric Manufacturing Company of Chicago, Ill. Also located on structural shelf 103 at a position forward of drive motor 106 is an AC motor 108 which drives fluid pump 109. AC motor 108 is mechanically coupled to fluid pump 109 by means of a suitable arrangement of pulleys 110 and 111 and belt 112. A suitable motor for AC motor 108 is a model 5KC37NN3 offered by the General Electric Company. Also arranged as part of this lower portion of apparatus 20 are deflector plates 115 and 116 which are utilized to baffle and direct the flow of hot exhaust gas which exits from second fan arrangement 23 across structural shelf 103. These deflector plates permit a more uniform distribution of this hot exhaust gas so that all areas within apparatus 20 may be uniformly heated for a corresponding reduction of temperature gradient with the external atmosphere.

The first fan arrangement 22 and the second fan arrangement 23, although oppositely located, are driven in a similar manner. Although second fan arrangment 23 will be described in detail, the same is to be understood as applicable to first fan arrangement 22. The structural location and support of second fan arrangement 23 has previously been described. In that arrangement, a drive motor 117 is rigidly mounted to one of the frame leg members of the box-like frame structure for apparatus 20. This drive motor is mechanically coupled to second fan arrangement 23 by means of a suitable pulley 118 and continuous belt 119. In order to preserve proper belt tension between second fan arrangement and drive motor 117, drive motor 117 is rigidly secured to an intermediate plate member 120 which is arranged so as to slide inwardly or outwardly with respect to the structural frame leg member so that the length of belt 119 can be altered as is necessary. A similar arrangement is provided for drive motor 121 which is associated with first fan arrangement 22.

The use of first fan arrangement 22 in combination with second fan arrangement 23 provides a unique concept in that first fan arrangement 22 acts in a pushing manner, pushing the hot exhaust gas through the drum member 39. Second fan arrangement 23 acts in a pulling manner, pulling the hot exhaust gas through drum member 39. The effect is that there is a zero pressure level created within the drum member in that there is neither an excess pressure nor a vacuum created and this contributes to the evenness and uniformity of the flow pattern through and across the various heat exchangers. This is desirable from the standpoint of maximum efficiency and uniform heat transfer. A suitable device for both first fan arrangement 22 and second fan arrangement 23 is a Dayton model 7C411 offered by W. W. Grainger, Inc. Inasmuch as a model 7C411 fan is operable at either 1,150 RPM or 1,725 RPM with a free air flow rate of 4,000 CFM, it is possible to create any one of eight different combinations of fan utilization by means of either turning one fan arrangement off or on and if on at one of its two speed settings. A further feature associated with first fan arrangement 22 involves the relative diameter sizes of exhaust stack 37 with respect to cylindrical body member 54 of drum member 39. Exhaust stack 37 measures approximately 12 to 14 inches in diameter while cylindrical body member measures approximately 18 inches in diameter. Consequently, when the hot exhaust gas flowing through exhaust stack 37 enters cylindrical body member 54, its flow velocity is significantly reduced in proportion to the cross-sectional area of these diameter measurements. This reduced exhaust gas flow speed means that heat transfer to the first and second arrangements of copper tubing of the first heat exchanger will be enhanced. If the exhaust gas flow speed was too fast, a greater portion of the heat would pass through to second fan arrangement 23 and would not be able to be utilized for the heat transfer by means of the various heat exchangers.

Figure 7:
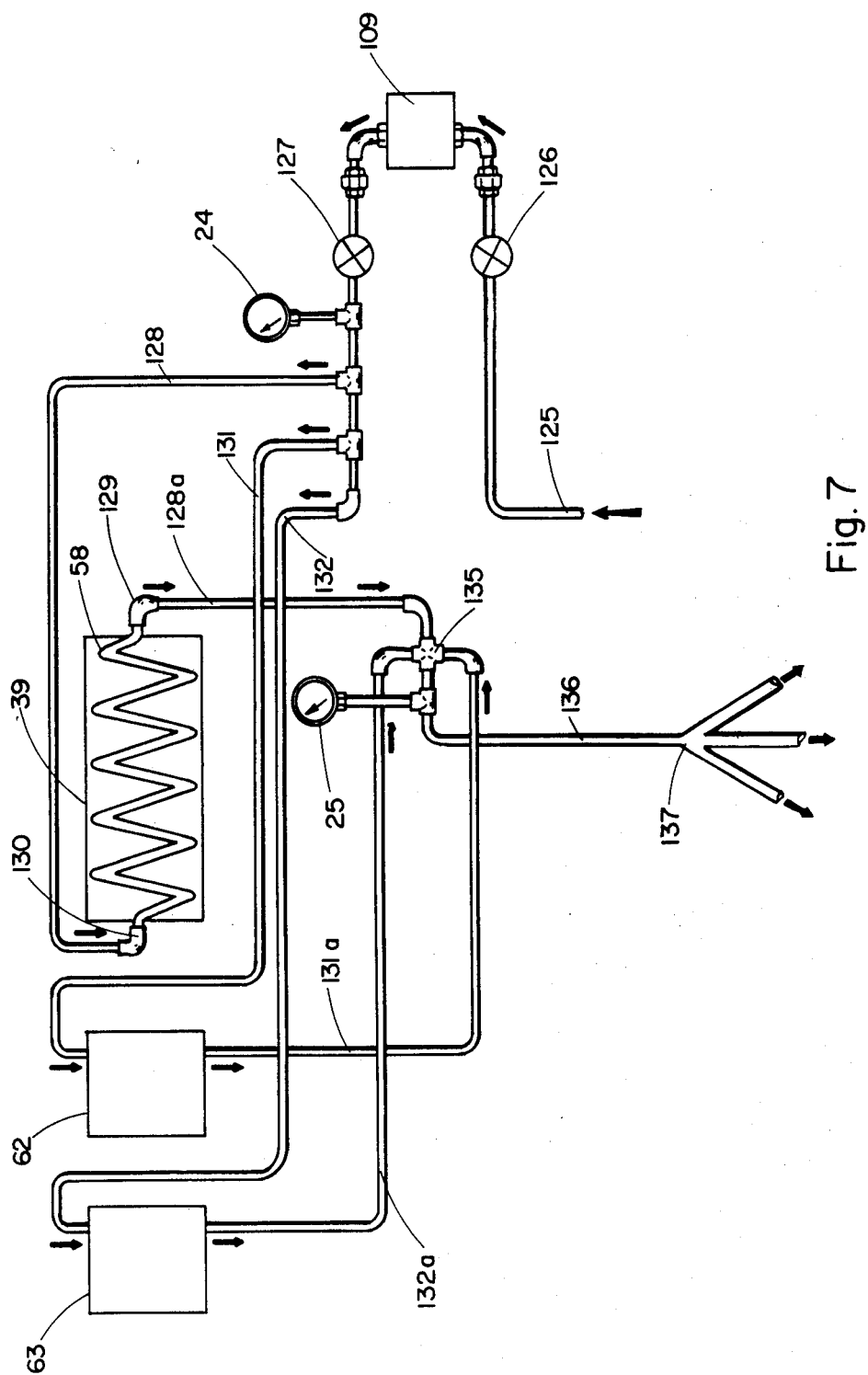
FIG. 7 is a schematic flow diagram of a fluid flow pattern associated with the FIG. 1 apparatus.

Referring to FIG. 7, the flow pattern of the heat-absorptive fluid is illustrated. Returning heat-absorptive fluid which is at a relatively low temperature is introduced into apparatus 20 at point 125. Cut-off valves 126 and 127 are provided on either side of fluid pump 109. A suitable fluid pump for this application is a model 1P830 offered by Teel Manufacturing Company of Chicago, Ill. This fluid pump operates at approximately 1,200 RPM and provides approximately 10 gallons per minute. Dial indicator 24 indicates the temperature of this incoming heat-absorptive fluid and after indicator 24, the flow path splits into three separate branches. The first branch 128 supplies heat-absorptive fluid to first heat exchanger 58 which is located within drum member 39. Rotary joints 129 and 130 are provided so that the first heat exchanger is able to rotate with drum member 39 while the connecting fluid tubing remains stationary. Second branch 131 couples to second heat exchanger 62 while third branch 132 couples to third heat exchanger 63. The return lines 128a, 131a and 132a connect at common point fitting 135 where they reunite into a single flow path. Dial indicator 25 indicates the temperature of this heat-absorptive fluid after heat transfer from the hot exhaust gas to this heat-absorptive fluid has occurred simultaneously within the three different heat exchangers. This single flow path indicated by pipe 136 extends to a remote location where it couples to additional heat exchangers. Such heat exchangers may be a finned arrangement located in combination with the cold air return duct of the conventional heating system for the particular structure. In this manner, the hot heat-absorptive fluid in flow pipe 136 is transferred to these remote heat exchangers at which point heat transfer from the heat-absorptive fluid to the passing cold air takes place and provides heat to the interior of the structure as a supplement to the conventional heating system. A point of split 137 is illustrated in FIG. 7 as representative of the flow split from flow pipe 136 when a plurality of remotely located heat exchangers are involved. The remaining dial indicators 26, 27 and 28 indicate the temperature of the entering hot exhaust gas, the temperature of the exhaust gas as it leaves second fan arrangement 27 and the fluid pressure being pumped through the various heat exchangers.

Figure 8:
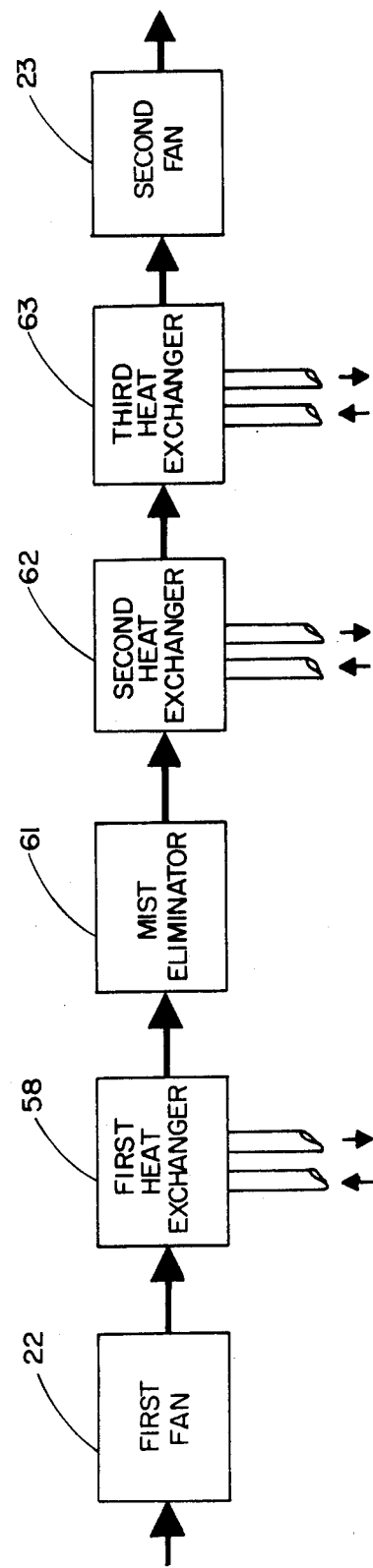
FIG. 8 is a block diagram of an exhaust gas flow path associated with the FIG. 1 apparatus.

Referring to FIG. 8, a block diagram is provided of the exhaust gas flow through apparatus 20. The first stage is through the first fan arrangement 22. From that point, the hot exhaust gas is passed through and across first heat exchanger 58 which as fluid flow lines communicating therewith. After first heat exchanger 58, the hot exhaust gas which now has had a portion of the grease removed therefrom as well as a portion of its heat, flows through mist eliminator 61 which extracts the remaining vapor within this gaseous flow. After mist eliminator, the exhaust gas flows through and across second heat exchanger 62 which also includes fluid connections communicating therewith and from there to third heat exchanger 63 also including fluid connections communicating therewith. The final stage of flow for the exhaust gas is through the second fan arrangement and then into the lower portion of apparatus 20.

Figure 6:
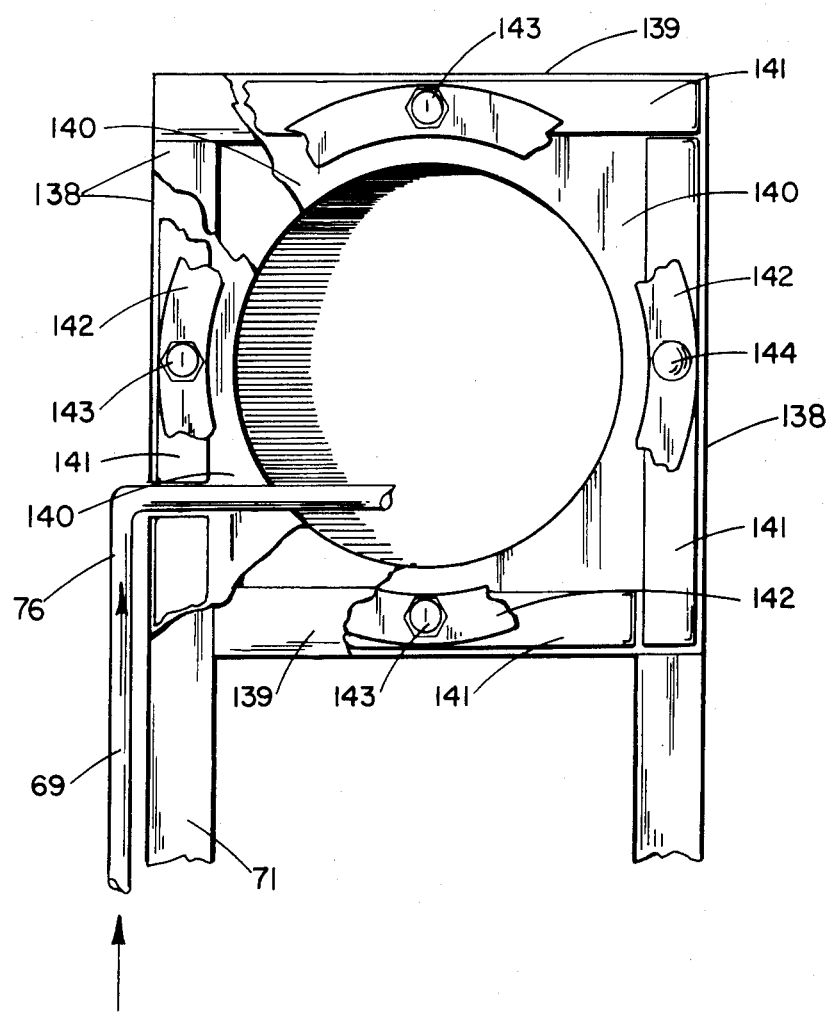
FIG. 6 is a fragmentary, partial side elevation view of another end of the FIG. 1 apparatus as taken along line 6—6 in FIG. 4.

A further feature of apparatus 20 is illustrated by FIG. 6 which shows in fragmentary form the mounting of first fan arrangement 22 onto the first end 40 of apparatus 20. As previously described, apparatus 20 incudes a structural frame portion which includes a series of aluminum angles and square aluminum tubing rigidly secured together. These structural frame members are indicated as upright frame members 138 and cross members 139. Inasmuch as these frame members provide a box-like frame structure into which drum member 39 is located, there remain corner areas disposed at the first end of member 39 which create an inefficient arrangement. Consequently, a skin sheet 140 having a circular opening therein which is slightly larger than the diameter of the cylindrical body member 54 is rigidly attached over first end 40. Bonded to the outer surface of this skin sheet 140 are strips 141 of rubber material. These strips 141 are arranged in a generally frame-like orientation substantially coincident with frame members 138 and 139. On top of these rubber strips 141 the flange 142 at flanged end 41 of first fan arrangement 22 is rigidly attached through strips 141 into frame members 138 and 139 and is secured thereto by means of three bolts 143. The fourth point of attachment of flange 142 of frame member 138 and 139 is by means of pivot pin 144. Once the fan arrangement 22 is disconnected from exhaust stack 37 and the three bolts 143 are each removed, first fan arrangement 22 is permitted to pivotally swing downwardly and out of the way of drum member 39 by means of pivot pin 144. This is desirable in the event spray nozzle heads 77 and 78 would need to be adjusted, repaired or replaced. Similarly, the first fan arrangement can be pivotally swung out of the way in the event minor repair, cleaning or other overhaul related work is desired to be performed on apparatus 20.

It can be seen then that what has been described by the foregoing description is a modular unit which can conveniently tie into an existing exhaust stack of a structure such as a restaurant. The various utility connections of apparatus 20 can be accomplished in a somewhat typical manner. Power box 147 is provided on the side of apparatus 20 for coupling the requisite electrical power to the various motors associated with apparatus 20. Similarly, drain tube 81 can be routed to the drain system of the structure and the entire unit can be rigidly secured to a rooftop level. By providing source 70 of chemical solution as part of apparatus 20, a minimum of fluid connections external to apparatus 20 are required. It should be noted, however, that source 70 of chemical solution may also include a supply of water 150. Once the chemical solution is sprayed onto the internal surfaces of apparatus 20 and begins the emulsifying of the grease, a water rinse is desirable to flush away this emulsified grease in liquid form. Although various chemical solutions can be used, the selection of which solution depends on the nature of the contaminant which is within the exhaust stream. A major contaminant material is believed to be grease as has been described; however, other contaminant substances can be removed from their corresponding gaseous flow stream by the selection of a proper chemical solution in which the paraticular contaminant material is soluble. A further feature of this invention is that the chemical solution need not be sprayed in a continuous manner but rather is sprayed in a pulsating manner. This permits the chemical solution to be sprayed onto a particular area of apparatus 20 and then remain there while its chemical action operates on the grease buildup. Then, a time interval later, a rinse of water is also pulsated across this same area thereby rinsing away the emulsified grease. In the preferred embodiment, water is pulsated in an on and off spray manner for approximately 50 minutes out of each hour. This pulsating spray mist of water is on for approximately 30 seconds and is then off for a corresponding 30 seconds. At the end of a 50-minute time interval, a chemical solution, such as a detergent, is pulse-sprayed in 30-second on and 30-second off intervals for approximately 10 minutes. This procedure conserves the chemical solution yet provides a sufficient amount for the emulsifying of the grease without excess and waste. Similarly, the mist sprayed is so fine that only approximately four gallons of water are used per hour. By having a continuously pulsating spray of water or chemical solution, the entire system is maintained in a wet condition. This means that fire starting is quite unlikely for two reasons. The first reason is that grease buildup is virtually eliminated from within apparatus 20 and the second reason is that the internal portions of apparatus 20 remain in a wet condition.

Although hot exhaust gas has been referred to, it is to be understood that the air-cleaning, heat-exchange apparatus disclosed herein also finds applicability as a cooling apparatus. In lieu of hot exhaust gas, consider any gaseous flow from a structure, such as ambient air, which has a temperature higher than the temperature of the heat-absorptive fluid circulating through the various heat-exchange means. A cooling coil in communication with the heat-absorptive fluid will provide a sufficient temperature difference for this application. Heat transfer will occur thereby resulting in a gaseous flow output from apparatus 20 which has a lower temperature than the entering flow. This output flow could then be introduced back into the structure for cooling. During this cooling mode of operation, the gaseous flow may still be chemically treated as has been described in order to remove any contaminants and especially odors from the ambient air.

A further feature of apparatus 20 is that the heat transfer (heat recovery) aspect of operation and the contaminant-removal aspect of operation are separate and distinct operational modes. The heat recovery mode may be used selectively as an option, while the contaminant removal (cleaning mode) goes on continuously with the operation of apparatus 20.

Figure 9:
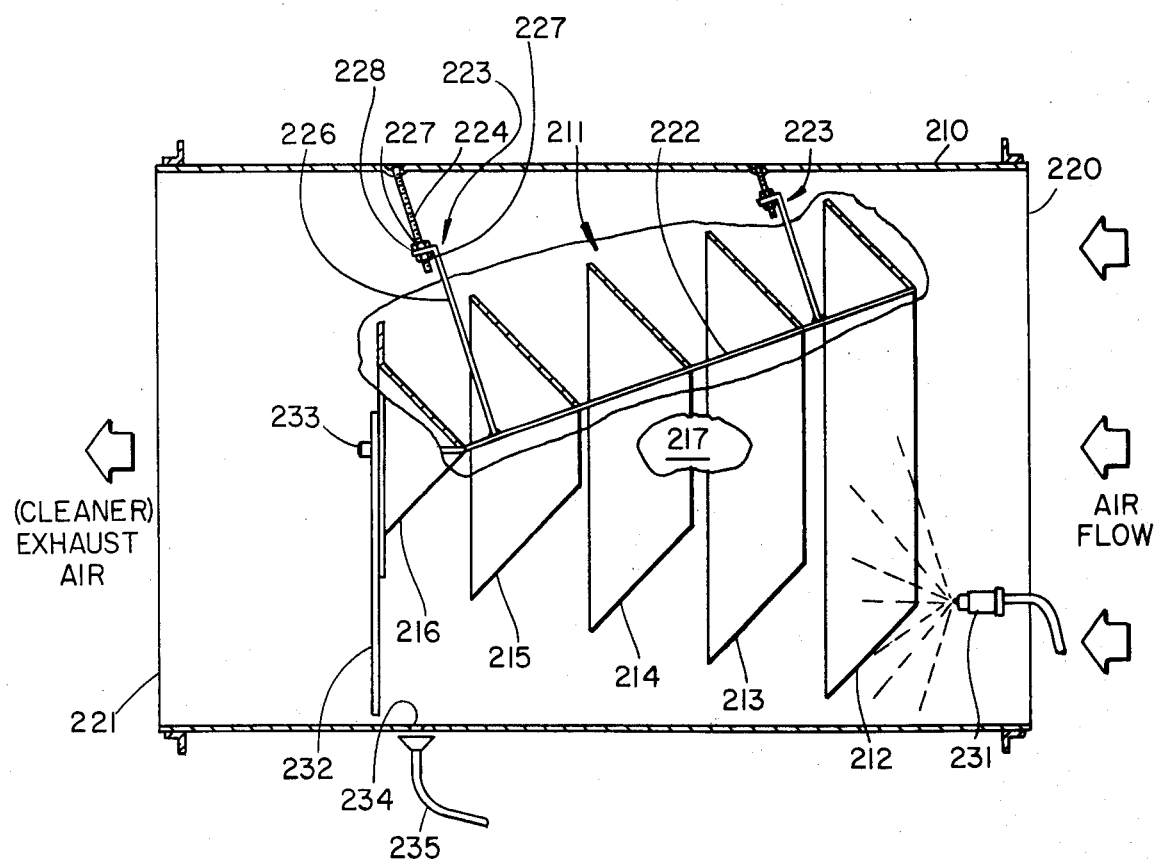
FIG. 9 is a sectioned, side elevation view of a contaminant-collecting drum comprising a portion of an alternative embodiment of the present invention.

Referring to FIG. 9, there is illustrated an alternative embodiment for the interior of drum member 39. Although drum member 210 (FIG. 9) is virtually identical to drum member 39 (FIG. 4), a new series of reference numerals are used in order to avoid any possible confusion due to numbering similarities.

While drum member 210 is illustrated as detached from the remainder of its associated air-cleaning, heat-exchange apparatus, it is to be understood that drum member 210 is arranged in a virtually identical fashion to drum member 39 and is driven in a similar manner and rotates at a similar rate.

The differences between drum member 210 and drum member 39 relate to the interior space and what structure is disposed therein. Drum member 210 does not have either of the two spiralled arrangements of copper tubing (59, 60) which constitute first heat exchanger 58. Nor does drum member 210 include the dual spray nozzle arrangement of nozzle heads 77 and 78. In lieu of these features, drum member 210 is arranged as described hereinafter.

Disposed within the interior void of drum member 210 is an inwardly tapering concentric arrangement 211 of five conical discs 212-216. These conical discs should be thought of as thin-walled cones which may be spun from a variety of metals and although five discs are illustrated, virtually any number is possible within the teachings of this invention. Discs 212-215 have been truncated by removal of the apex portion thereby creating a frustoconical appearance and creating a central passageway 217 therethrough. This central passageway is coincident with the cylindrical axis of drum member 210 and as such is centrally disposed in the entering flow stream of grease-laden, hot exhaust gas. Each disc has an approximate 45° conical taper and passageway 217 is also conical in appearance tapering to a point coincident with the apex of disc 216.

The conical (frustoconical) discs 212-215 are of a decreasing outside diameter such that the arrangement tapers inwardly moving from inlet end 220 of drum member 210 toward outlet end 221. It should be apparent from the FIG. 9 illustration that a straight line projection (horizontal) of each disc toward the inlet end indicates that a portion of each disc has a direct line of sight with respect to the entering flow stream of exhaust gas. As the gas enters drum member 210, a portion of the incoming flow will impinge directly upon disc 212 and radiate outwardly along its exterior surface. Similarly, remaining portions of the flow will impinge upon the remaining discs and also radiate outwardly along the exterior surfaces of these discs. Disc 216 is not truncated and thus, any flow reaching this point will be conducted across the full conical exterior of disc 216.

Since disc 212 is spaced apart from the interior wall of drum member 210 by only a very slight separation, virtually the entire entering flow stream must flow across the conical surfaces of the discs as well as some flow across the inside diameter surface of drum member 210. The result from this flow pattern is that almost all the grease (or other contaminants) present in the exhaust gas is removed from the gas and deposited on these collecting surfaces. The exiting flow, while still at an elevated temperature, leaves the drum member virtually grease-free and correspondingly virtually odor-free.

Arrangement 211 is rigidly attached together by means of center rods 222 of which there are three. These three rods are welded (or brazed) to the apex of disc 216 and radiate outwardly therefrom in an evenly spaced manner. Although only one rod 222 has been illustrated in FIG. 9, the location of the other two should be clear from the foregoing description. Each rod contacts and is welded (or brazed) to the inner edge of the truncated end of discs 212-215. This assembly technique provides a desired rigidity and facilitates accurate spacing of the discs.

Arrangement 211 is attached to the interior surface of drum member 210 by means of adjustable subassemblies 223. Each subassembly includes a threaded rod 224 welded to the inner surface of the drum member, a support arm 226 welded to center rod 222 and a pair of hex nuts 227. Support arm 226 includes a folded flange 228 with a clearance hole therethrough which receives the end of threaded rod 224. The two hex nuts are threadedly received by rod 224 on opposite sides of the flange. By adjusting the relationship between rod 224 and arm 226 of the six subassemblies, arrangement 211 is able to be accurately positioned within drum member 210 and securely retained in its selected orientation. Thus, as drum member 210 is driven in the manner described above and rotates at its relatively low speed, arrangement 211 correspondingly moves. As is evident from the FIG. 9 illustration, arrangement 211 is located centrally between the ends of drum member 210 and occupies somewhere between 75 and 85% of the total length of drum member 210.

Extending into the interior of drum member 210 through inlet end 220 is spray nozzle 231. Nozzle 231 is suspended free of the drum member and thus remains stationary and fixed in location as the drum member rotates. Nozzle 231 is designed with a 160° spray orifice and is centered in the lower half of drum member 211 pointing at the inner edge of the truncated end of disc 212. Nozzle 231 serves the same purpose as nozzles 77 and 78—that being to wash down the grease-collecting surfaces with a grease-emulsifying chemical solution. In this regard, nozzle 231 is connected to a source of solution and pump similar to that arrangement described for nozzles 77 and 78.

Nozzle 231 is effectively designed and positioned to reach extensive portions of the interior surfaces as well as portions of the entering exhaust gas. Although nozzle 231 is centered in the lower half of drum member 210 as the drum member slowly rotates with nozzle 231 remaining stationary, all interior surfaces will be washed down with each revolution of the drum member. Any portion of the spray which might pass through the staggered series of discs is prevented from entering the downstream heat exchangers by deflector plate 231 which is freely suspended from arrangement 211 and remains constantly in its illustrated downwardly hanging orientation due to pivotal connection 233. Drain 234 removes the emulsified grease and liquid carrier by means of tubing 235. The interior surface of drum member 210 is very slightly tapered to aid in the flow of accumulated liquid to drain 234. Due to the 160° spray orifice construction of nozzle 231, the spray may be generated intermittently such as for a few seconds out of each two or three-minute interval and such intermittent performance is controlled by an appropriate timer mechanism.

One advantage that arrangement 211 has over the crossing spiral tubing arrangement of FIG. 4 is the increased surface area for collection of grease or whatever other contaminant may be present. Arrangement 211 also more effectively prevents the passage of moisture (due to the spray nozzles) through the downstream heat exchangers and depending upon how the "cleaned" exhaust is going to be reused, may be preclude the need for the mist eliminator. Although extremely desirable in most respects, arrangement 211 has one shortcoming which is not present with the spiralled tubing configuration, and that is the element of cost. While the spiral tubing may be very quickly and easily fabricated, the discs present a more expensive construction technique. A further shortcoming may involve the lack of any effective heat transfer at this first stage location which is provided by the FIG. 4 arrangement due to water being circulated through the spiral tubing arrangements. However, since different applications for apparatus 20 will naturally entail different conditions, treatment requirements and desired end uses for the exhaust gas, both the FIG. 4 and FIG. 9 drum arrangements are believed to be necessary options for apparatus 20.

Figure 10:
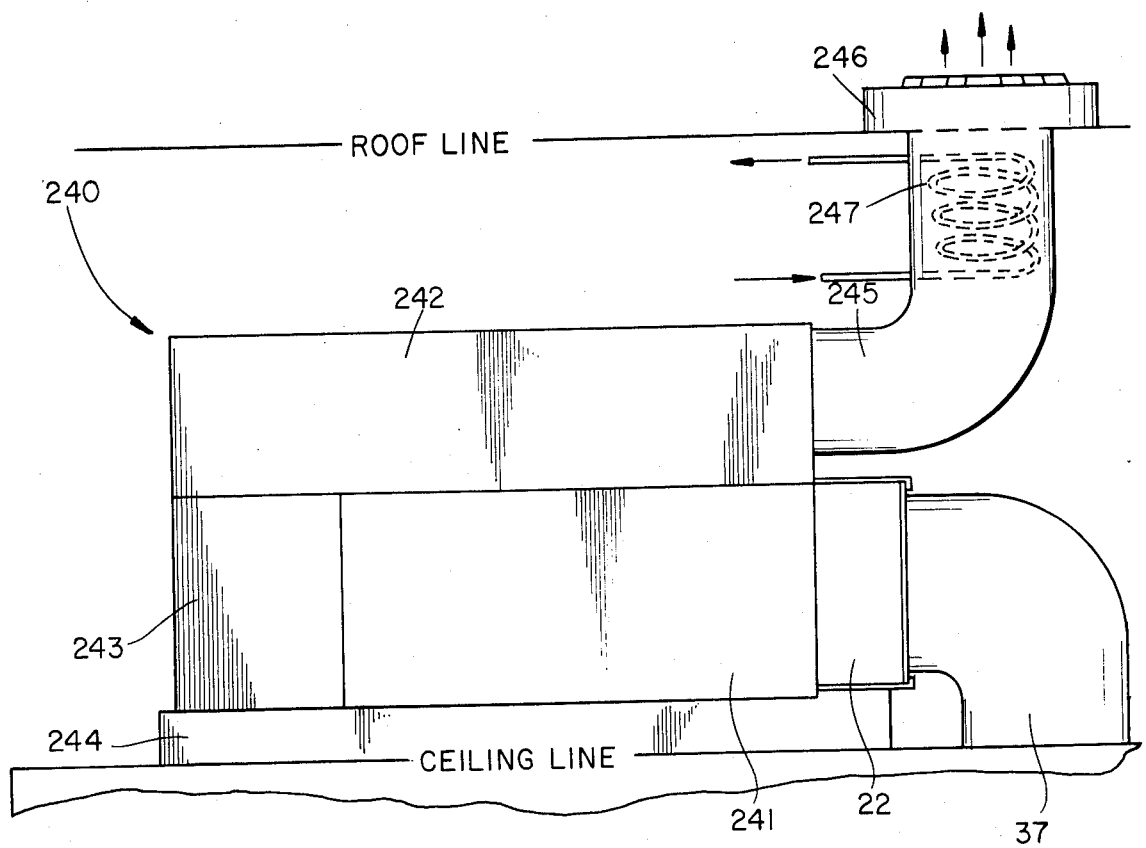
FIG. 10 is a side elevational view of an alternative exhaust-cleaning, heat-exchange apparatus according to a typical embodiment of the present invention.
Figure 11:
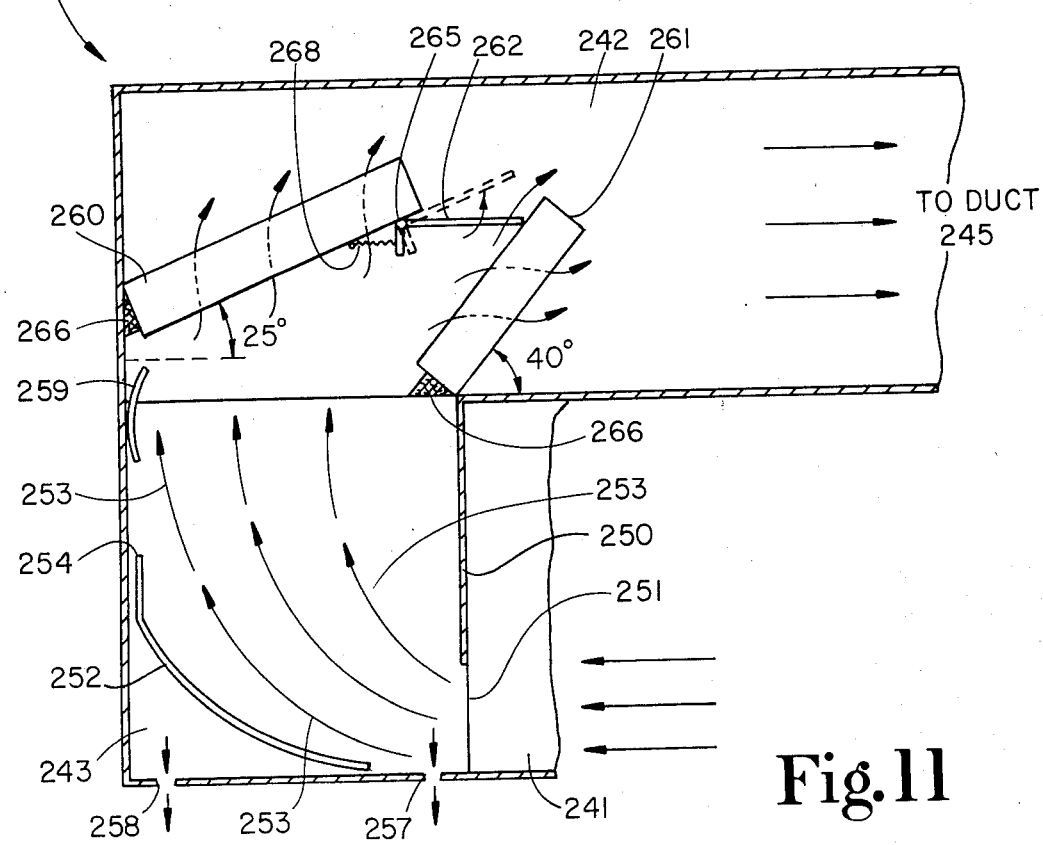
FIG. 11 is a sectioned, side elevation view of the FIG. 10 apparatus.

Referring to FIGS. 10 and 11, an alternative arrangement for the main housing portion which serves to route the "cleaned" exhaust gases to some downstream location or remote use point is illustrated. The embodiment of FIG. 1 involves the use of a connecting duct portion 32 and second fan arrangement 23 in order to pull the gases leaving the third heat exchanger 63 into the lower portions of apparatus 20 (beneath drum member 39). In the FIGS. 10 and 11 embodiment, the connecting duct, second fan arrangement and lower portion region have all been eliminated and that portion of apparatus 240 (the same as apparatus 20, except for the differences to be described hereinafter) which includes the drum member is the same as either the FIG. 4 or FIG. 9 embodiments. If a mist eliminator is included, it is located in portion 241, but the heat-exchange locations (except for that involved with the spiral tubing) occurs in portion 242. Portion 243 serves as a connecting link or chamber and also provides additional contaminant-collecting surfaces.

Apparatus 240 rests upon platform 244 which is located directly atop the ceiling line of the structure. Incoming hot exhaust gases (via exhaust stack 37 and first fan arrangement 22) are processed by the drum member and nozzle arrangement within portion 241 and then passes into portion 243 and from there into portion 242 where the primary heat exchanging occurs. The exhaust gases which by now have been "cleaned" and reduced in temperature pass out through duct 245 and exhaust fan 246 which is mounted at the roof line of the structure. As a final stage heat exchanger, a length of spiralled copper tubing 247 is disposed within duct 245 through which a working fluid (such as water) circulates. Tubing 247 is coupled to a source of hot water and supplements such source when the exiting gases are sufficiently hot to create a favorable heat transfer result.

Apparatus 240 incorporates a similar dual-fan arrangement to that of apparatus 20. In apparatus 20, first fan arrangement is located upstream from the locations where all the cleaning and heat transfer functions occur and this remains consistent with apparatus 240. In apparatus 240, exhaust fan 246 is located downstream from the locations of such heat transfer functions and the exhaust gas flow through apparatus 240, similar to apparatus 20, is accomplished on a push-pull effect. A positive pressure is created on the upstream side preceding the heat-transfer functions and a negative pressure (vacuum) is created on the downstream side following the heat transfer function locations.

Referring to FIG. 11, the exhaust gas flow through apparatus 240 and the heat-exchange steps are illustrated in greater detail. Deflector panel 250 forces the exhaust gases entering portion 243 to be directed through opening 251. With opening 251 directly across from baffle panel 252, panel 252 serves as a contaminant (grease) collecting surface and such grease is in emulsified form in a liquid carrier. The passing exhaust gas flow (arrows 253) forces any grease buildup on panel 252 to ride up and curl over top edge 254. Two drains 257 and 258 are provided to remove contaminants and fluids which collect at the base of portion 243, either upstream from panel 252 (drain 257) or behind panel 252 (drain 258).

The exhaust gas flow (which is now effectively hot air) flows upwardly from portion 243 into portion 242 and deflector strip 259 aids in redirecting this flow into a reverse flow direction from that through portion 241. Extending the full width of portion 242 are two heat exchangers 260 and 261 which are of the same finned, radiator-styled heat exchangers as heat exchangers 62 and 63. Extending between heat exchangers 260 and 261 is a spring-loaded damper plate 262 which pivots by means of hinge 265 which is secured to the underside of exchanger 260 and sealingly closes against exchanger 261. This heat exchanger and damper plate arrangement completely closes off the flow in portion 242 from reaching duct 245 except to the extent that the flow passes through the heat exchangers or is allowed to leak past damper plate 262.

Heat exchanger 260 is disposed at approximately a 25° angle and includes packing material 262 at one end to improve the effectiveness of its seal at this point. Heat exchanger 261 is disposed at approximately a 40° angle and also uses packing material to improve its seal. Due to the exhaust gas flow blockage as described, all of the hot exhaust (now "clean") must pass through the heat exchangers. However, there is a maximum flow rate through these heat exchangers due to their construction. Under certain heavy flow conditions, excessive back pressure can develop within the various portions. The problem with such back pressure is that it adversely affects the free flow from the structure exhaust stack and causes exhaust backup into the structure and overall inefficient operation.

The present invention resolves this potential problem by means of pivotal damper plate 262. At any time that the back pressure begins to build, a force is created on plate 262 which upon overcoming the spring constant pivots upwardly (arrow 267) creating an escape path between plate 262 and heat exchanger 261. The spring constant for spring 268 is relatively low so that even a slight pressure buildup will be sufficient to create a correspondingly sized escape opening and once the pressure force is relieved, spring 268 returns damper plate 262 to its sealingly closed position against heat exchanger 261.

The heat exchangers may either be utilized in combination with other remote heat exchangers for heating makeup air or for heating water or similar applications. The specific options are varied, but it is desirable to utilize the extracted heat from the exhaust in some manner for the advantages of energy conservation and savings. The particular use will depend in part upon the type of structure involved and the types of heating requirements.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An exhaust-cleaning apparatus for removing contaminant material from a hot exhaust gas from a structure exhaust stack, said exhaust-cleaning apparatus comprising:

a main housing portion communicating with said structure exhaust stack;

a rotary drum member disposed within said main housing portion;

contaminant-collecting surface means disposed within said drum member and including the interior surface of said drum member, said contaminant collecting surface means including a plurality of similarly shaped annular members spaced apart and sequentially arranged in order of decreasing size;

sprayer means arranged within said main housing portion and directed toward said contaminant-collecting surface means for spraying a chemical solution from a suitable source onto said contaminant-collecting surface means, said contaminant material being soluble to said chemical solution; and a first fan arrangement in communication with said main housing portion for routing said hot exhaust gas through said main housing.

2. The apparatus of claim 1 which further includes a spray nozzle directed toward said plurality of annular members.

3. The apparatus of claim 1 wherein said plurality of annular members are substantially concentric to each other.

4. The apparatus of claim 3 wherein said drum member has a flow inlet end and a flow exit end, the largest of said annular members of said plurality being disposed adjacent said flow inlet end.

5. The apparatus of claim 4 wherein the smallest of said annular members being closed at its center, the remaining annular members of said plurality being open in their central portion and defining a flow passageway therethrough.

6. The apparatus of claim 1 wherein said annular members are conical annuli.

7. The apparatus of claim 6 wherein said plurality of conical annuli range in size from a largest to a smallest, the smallest of said conical annuli being closed at its apex, the remaining ones of said plurality of conical annuli being truncated into a frustoconical shape thereby defining a flow passageway therethrough for entering exhaust gases.

8. The apparatus of claim 6 wherein said plurality of conical annuli are adjustable suspended within said drum member by an arrangement of rods joined to said conical annuli, to the interior of said drum member and to each other.

9. The apparatus of claim 1 wherein said main housing portion is segmented into a contaminant-collecting portion including said contaminant-collecting surface means and into a heat-exchange portion including heat-exchange means for transferring heat from said hot exhaust gas.

10. The apparatus of claim 9 wherein said contaminant-collecting portion and said heat-exchange portion are arranged in end-to-end flow relationship such that the flow of exhaust gases completely leaves said contaminant-collecting portion before entering said heat-exchange portion.

11. The apparatus of claim 10 wherein said heat-exchange means includes a plurality of heat exchangers disposed within said heat-exchange portion and cooperatively arranged to partially close off any direct flow of exhaust gases through said heat-exchange portion.

12. The apparatus of claim 11 wherein said heat-exchange means further includes a spring-biased damper hinged to one heat exchanger of said plurality and closing against another heat exchanger of said plurality to complete the closing off of said heat-exchange portion.

13. The apparatus of claim 12 wherein said damper being arranged to automatically move to an open condition in response to pressure within said heat-exchange portion.

14. The apparatus of claim 9 wherein said heat-exchange means includes two heat exchangers and a damper plate disposed therebetween, said heat exchangers and damper plate being disposed completely across said heat-exchange portion so as to restrict any exhaust gas flow through said heat-exchange portion to passage through said heat exchangers and passed said damper plate.

15. The apparatus of claim 14 wherein said heat-exchange portion has an inlet opening in flow communication with said contaminant-collecting portion and said two heat exchangers are disposed on opposite sides of said inlet opening, a first end of each heat exchanger being positioned adjacent said inlet opening and said damper plate being positioned across opposite ends of said heat exchangers.

16. The apparatus of claim 15 wherein said main housing portion further includes a connecting portion disposed between said contaminant-collecting portion and the inlet opening of said heat-exchange portion, said connecting portion including a contaminant-collecting baffle plate for directing exhaust gas flow from said contaminant-collecting portion into said heat-exchange portion.

* * * * *